United States Patent
Miyake et al.

(10) Patent No.: US 11,219,825 B2
(45) Date of Patent: Jan. 11, 2022

(54) NON-TRANSITORY COMPUTER-READABLE MEDIUM AND VIDEO GAME PROCESSING SYSTEM

(71) Applicant: SQUARE ENIX CO., LTD., Tokyo (JP)

(72) Inventors: Youichiro Miyake, Tokyo (JP); Makoto Hasegawa, Tokyo (JP)

(73) Assignee: SQUARE ENIX CO., LTD., Tokyo (JP)

(*) Notice: Subject to any disclaimer, the term of this patent is extended or adjusted under 35 U.S.C. 154(b) by 0 days.

(21) Appl. No.: 17/009,550

(22) Filed: Sep. 1, 2020

(65) Prior Publication Data
US 2021/0060427 A1 Mar. 4, 2021

(30) Foreign Application Priority Data
Sep. 4, 2019 (JP) .............................. JP2019-161518

(51) Int. Cl.
*A63F 13/35* (2014.01)
*A63F 13/49* (2014.01)

(52) U.S. Cl.
CPC .............. *A63F 13/35* (2014.09); *A63F 13/49* (2014.09)

(58) Field of Classification Search
None
See application file for complete search history.

(56) References Cited

U.S. PATENT DOCUMENTS

| 2008/0139318 A1* | 6/2008 | Van Luchene | A63F 13/12 463/42 |
| 2010/0197409 A1* | 8/2010 | Van Luchene | G07F 17/3244 463/42 |
| 2012/0077599 A1* | 3/2012 | Van Luchene | A63F 13/75 463/42 |

FOREIGN PATENT DOCUMENTS

JP      2012213485 A    11/2012

* cited by examiner

*Primary Examiner* — Ronald Laneau
(74) *Attorney, Agent, or Firm* — Dorsey & Whitney LLP

(57) ABSTRACT

A non-transitory computer-readable medium including a video game processing program is provided. The video game processing program causes a server to: set regions by grouping movable areas of a character in a virtual space; set a value to each region; propagate each belonging parameter to any adjacent region of the corresponding region so that an absolute value of the belonging parameter decreases and set the belonging parameter after decrease to the corresponding region in a case Where any other belonging parameter has not been set thereto yet; and calculate a sum of absolute values of two different belonging parameters in a region at which a moving number of regions from each region is substantially equal to each other or a boundary of the region, and set the region, the boundary of the region, or regions adjacent to the boundary of the region as an indicator portion.

6 Claims, 11 Drawing Sheets

NON-TRANSITORY COMPUTER-READABLE MEDIUM AND VIDEO GAME PROCESSING SYSTEM

CROSS-REFERENCE TO RELATED APPLICATION (S)

The present application claims priority to Japanese Patent Application No. 2019-161518 filed on Sep. 4, 2019, the disclosure of which is expressly incorporated herein by reference in its entirety.

BACKGROUND OF THE INVENTION

1. Field of the Invention

At least one of embodiments of the present invention relates to a non-transitory compute readable medium including a video game processing program and a video game processing system for causing a server to perform functions to set an indicator suitable to cause a character other than an operation target of a user to carry out an action along a purpose.

2. Description of the Related Art

Heretofore, various kinds of techniques for moving a character in a video game have been proposed.

In such techniques, there is one in which a moving route of a character is searched by using positional information regarding a virtual space that constitutes a video game and a navigation mesh and waypoints are utilized. In order to suppress a processing load required for a search of the moving route from being increased, there is one in which arrangement of route candidate locations in a search region is determined so that an interval between route candidate locations arranged outside a predetermined area is greater than an interval of route candidate locations arranged in the predetermined area of the search region. Examples of apparatuses, systems, and programs may be found in Japanese Published Patent Application No. JP2012-213485A.

SUMMARY

Meanwhile, in a case where an action of a character other than an operation target of a user (that is, a non-player character: NPC) is controlled automatically, it is possible to search a moving route so long as there are a navigation mesh and waypoints as described above. However, a portion that becomes an indicator of the action in a virtual space may be set in order to cause the NPC to carry out a suitable action along a purpose. For example, in a video game in which influence to which a character as the operation target of the user (that is, a player character: PC) belongs and influence to which the NPC as an enemy character belongs carries out a gun battle with each other in the virtual space, it looks unnatural if there is an NPC that takes an action to move to a region where opponent's influence is positioned at random. Therefore, there is a demand for executing a control in which it looks that the NPC carries out an action with a sense of tension, for example, a control that there is necessary fir the PC to carefully act because a region beyond here is a region where there is a high possibility that an enemy exists. However, there has been a problem that if unsuitable indicator setting is executed, it is impossible to control the PC so as to carry out an action along a purpose.

It is an object of at least one of embodiments of the present invention to solve the problem described above, and execute setting of an indicator suitable to cause a character other than an operation target of a user to carry out an action along a purpose.

According to one non-limiting aspect of the present invention, there is provided a non-transitory computer-readable medium including a non-transitory computer-readable medium including a video game processing program for causing a server to perform functions to control progress of a video game.

The functions include a region setting function configured to set a plurality of regions by grouping movable areas of a character in a virtual space on a basis of a predetermined rule.

The functions also include a belonging parameter setting function configured to set, in a case where each of two or more characters respectively belonging to different groups in the virtual space is positioned at any of the regions, a predetermined value to each of the regions at which the characters are respectively positioned as a belonging parameter, the belonging parameter indicating a belonging group of each of the characters, an absolute value of the belonging parameter becoming maximum at the predetermined value.

The functions also include a propagating function configured to propagate each of the belonging parameters to any of adjacent regions of the corresponding region so that the absolute value of the belonging parameter decreases by a predetermined value every movement from the corresponding region to the adjacent region, the propagating function being configured to set the belonging parameter after decrease to the corresponding region in a case where any other belonging parameter has not been set thereto yet.

The functions also include an indicator setting function configured to calculate, as a result of a fact that each of the belonging parameters is propagated, a sum of absolute values of two different belonging parameters in a predetermined region at which a moving number of regions from each of regions at which two characters belonging to different groups are respectively positioned is substantially equal to each other or a boundary of the predetermined region, propagation of the different belonging parameters encountering each other at the predetermined region or on the boundary of the predetermined region, the indicator setting function being configured to set, with respect to a region where the sum of the absolute values satisfies a predetermined condition or a boundary portion of the region, the region, the boundary of the region, or regions adjacent to the boundary of the region as an indicator portion, the indicator portion becoming an indicator of an action of the character.

According to another non-limiting aspect of the present invention, there is provided a video game processing system for executing a process to control progress of a video game. In this case, the video game processing system includes a communication network, a server, and a user terminal.

The video game processing system includes a region setting unit configured to set a plurality of regions by grouping movable areas of a character in a virtual space on a basis of a predetermined rule.

The video game processing system also includes a belonging parameter setting unit configured to set, in a case where each of two or more characters respectively belonging to different groups in the virtual space is positioned at any of the regions, a predetermined value to each of the regions at which the characters are respectively positioned as a belonging parameter, the belonging parameter indicating a belonging group of each of the characters, an absolute value of the belonging parameter becoming maximum at the predetermined value.

The video game processing system also includes a propagating unit configured to propagate each of the belonging parameters to any of adjacent regions of the corresponding region so that the absolute value of the belonging parameter decreases by a predetermined value every movement from the corresponding region to the adjacent region, the propagating unit being configured to set the belonging parameter after decrease to the corresponding region in a case where any other belonging parameter has not been set thereto yet.

The video game processing system also includes an indicator setting unit configured to calculate, as a result of a fact that each of the belonging parameters is propagated, a sum of absolute values of two different belonging parameters in a predetermined region at which a moving number of regions from each of regions at which two characters belonging to different groups are respectively positioned is substantially equal to each other or a boundary of the predetermined region, propagation of the different belonging parameters encountering each other at the predetermined region or on the boundary of the predetermined region, the indicator setting unit being configured to set, with respect to a region where the sum of the absolute values satisfies a predetermined condition or a boundary portion of the region, the region, the boundary of the region, or regions adjacent to the boundary of the region as an indicator portion, the indicator portion becoming an indicator of an action of the character.

According to still another non-limiting aspect of the present invention, there is provided a non-transitory computer-readable medium including a non-transitory computer-readable medium including a video game processing program for causing a user terminal to perform functions to control progress of a video game.

The functions include a region setting function configured to set a plurality of regions by grouping movable areas of a character in a virtual space on a basis of a predetermined rule. The functions also include a belonging parameter setting function configured to set, in a case where each of two or more characters respectively belonging to different groups in the virtual space is positioned at any of the regions, a predetermined value to each of the regions at which the characters are respectively positioned as a belonging parameter, the belonging parameter indicating a belonging group of each of the characters, an absolute value of the belonging parameter becoming maximum at the predetermined value.

The functions also include a propagating function configured to propagate each of the belonging parameters to any of adjacent regions of the corresponding region so that the absolute value of the belonging parameter decreases by a predetermined value every movement from the corresponding region to the adjacent region, the propagating function being configured to set the belonging parameter after decrease to the corresponding region in a case where any other belonging parameter has not been set thereto yet.

The functions also include an indicator setting function configured to calculate, as a result of a fact that each of the belonging parameters is propagated, a sum of absolute values of two different belonging parameters in a predetermined region at which a moving number of regions from each of regions at which two characters belonging to different groups are respectively positioned is substantially equal to each other or a boundary of the predetermined region, propagation of the different belonging parameters encountering each other at the predetermined region or on the boundary of the predetermined region, the indicator setting function being configured to set, with respect to a region where the sum of the absolute values satisfies a predetermined condition or a boundary portion of the region, the region, the boundary of the region, or regions adjacent to the boundary of the region as an indicator portion, the indicator portion becoming an indicator of an action of the character.

According to each of the embodiments of the present application, one or wo or more shortages are solved.

BRIEF DESCRIPTION OF DRAWINGS

The foregoing and other objects, features and advantages of the present invention will become more readily apparent from the following detailed description of preferred embodiments of the present invention that proceeds with reference to the appending drawings.

DETAILED DESCRIPTION OF THE INVENTION

Hereinafter, examples of embodiments according to the present invention will be described with reference to the drawings. Note that various components in the respective embodiments described below can be appropriately combined without any contradiction or the like. In addition, the description of the content described as a certain embodiment may be omitted in another embodiment. Further, the content of an operation or processing that does not relate to features of each of the embodiments may be omitted. Moreover, the order of various processes that constitute various flows described below may be changed without any contradiction or the like of processing content.

First Embodiment

Figure 1:
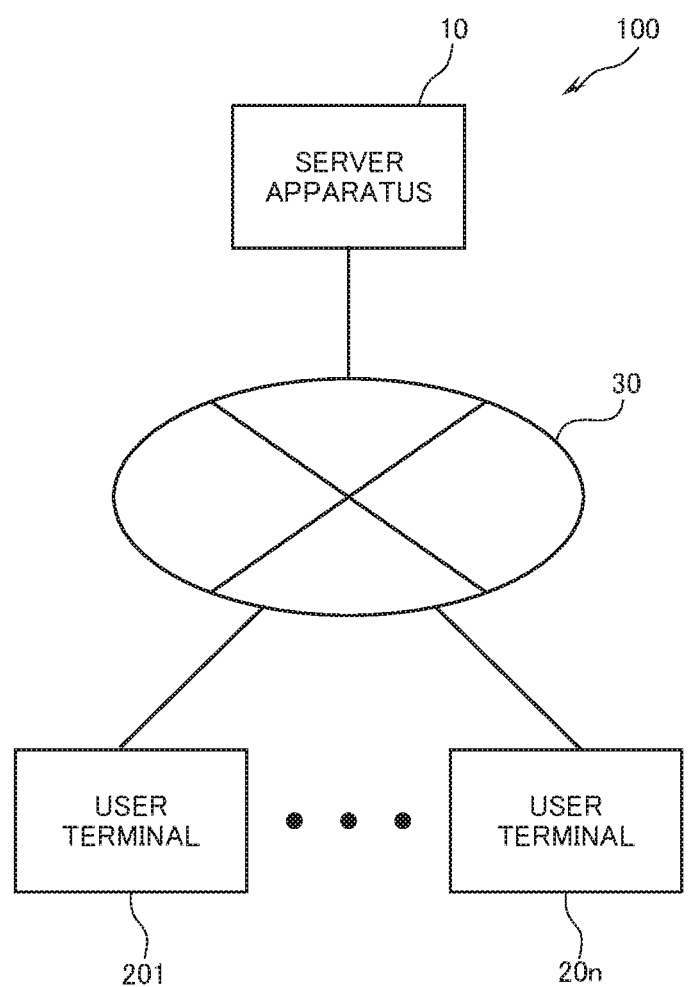
FIG. 1 is a block diagram illustrating an example of a configuration of a video game processing system corresponding to at least one of the embodiments of the present invention.

FIG. 1 is a block diagram illustrating an example of a configuration of a video game processing system 100 according to one embodiment of the present invention. As illustrated in FIG. 1, the video game processing system 100 includes a server apparatus 10 and user terminals 201 to 20n ("n" is an arbitrary integer, hereinafter, by representing them, simply referred to as a "user terminal 20") respectively used by users of the video game processing system 100. In this regard, the configuration of the video game processing system 100 is not limited to this configuration. The video game processing system 100 may be configured so that the plurality of users uses a single user terminal, or may be configured so as to include a plurality of server apparatuses.

Each of the server apparatus 10 and the plurality of user terminals 201 to 20n is connected to a communication network 30 such as the Internet. In this regard, although it is not illustrated in the drawings, the plurality of user terminals 201 to 20n is connected to the communication network 30 by executing data communication with base stations managed by a telecommunication carrier, for example, by means of a radio communication line.

The video game processing system 100 includes the server apparatus 10 and the plurality of user terminals 201 to 20n, whereby various kinds of functions for executing various kinds of processing in response to an operation of the user is performed.

The server apparatus 10 is managed by an administrator of the video game processing system 100, and has various kinds of functions to provide information regarding various kinds of processing to the plurality of user terminals 201 to 20n. In the present embodiment, the server apparatus 10 is constructed by an information processing apparatus, such as a WWW server, and includes a storage medium for storing various kinds of information. In this regard, the server apparatus 10 is provided with a general configuration for executing the various kinds of processing as a computer, such as a control section and a communicating section. However, its explanation herein is omitted. Further, in the video game processing system 100, it is preferable that the server apparatus 10 manages various kinds of information from a point of view to reduce a processing load on each of the plurality of user terminals 201 to 20n. However, a storing section for storing various kinds of information may include a storage region in a state that the server apparatus 10 can access the storage region. For example, the server apparatus 10 may be configured so as to be provided with a dedicated storage region outside the server apparatus 10.

The plurality of user terminals 201 to 20n is respectively managed by the users. Each of the plurality of user terminals 201 to 20n may be a communication terminal such as a cellular telephone terminal or a PDA (Personal Digital Assistants), for example. It is necessary that each of the plurality of user terminals 201 to 20n is configured so as to mount a camera device for photographing at least one of a moving image or a still image by the user and include a display for displaying photographed image data or the like. As other examples of the user terminal, there are a so-called wearable divide such as a smartwatch, and a combination of the wearable divide and the communication terminal. Further, the camera device may include an optical camera, or may be one that uses a three-dimensional camera device together. Further, each of the user terminals 201 to 20n includes inputting means for inputting drawing information, such as a mouse, a touch panel, or a touch pen.

Further, each of the plurality of user terminals 201 to 20n is connected to the communication network 30, and includes hardware and software for executing various kinds of processes by communicating with the server apparatus 10. In this regard, each of the plurality of user terminals 201 to 20n may be configured so as to be capable of directly communicating with each other without using the server apparatus 10.

In process of executing information processing, the server apparatus 10 appropriately transmits a process stage to each of the plurality of user terminals 201 to 20n. Each of the user terminals 201 to 20n causes a display device to display the screen content based on the content of the received process stage on a display screen of the display device. The server apparatus 10 may generate the screen content, or each of the plurality of user terminals 201 to 20n may generate the screen content.

Figure 2:
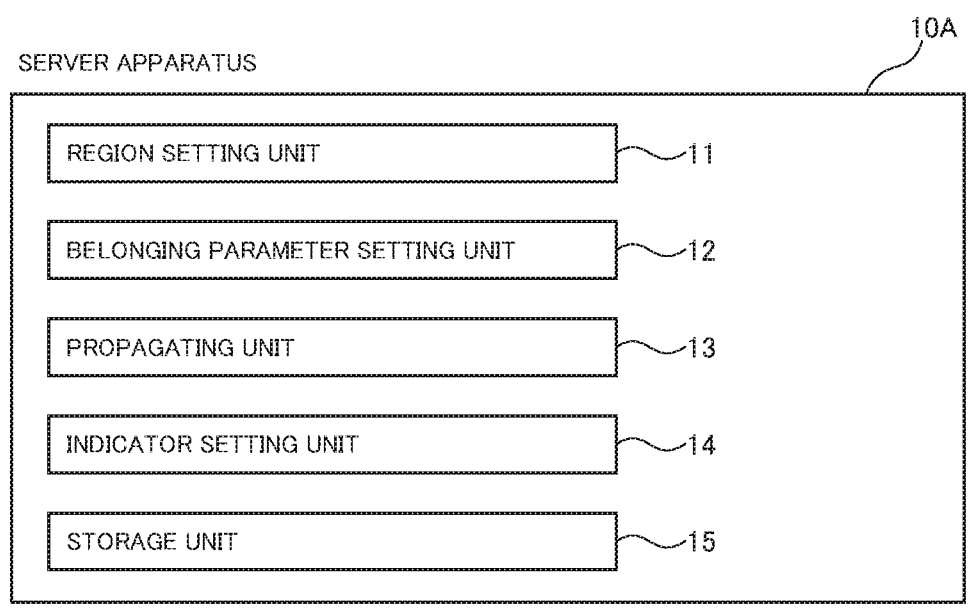
FIG. 2 is a block diagram illustrating a configuration of a server apparatus corresponding to at least one of the embodiments of the present invention.

FIG. 2 is a block diagram illustrating a configuration of a server apparatus 10A, which is an example of the server apparatus 10 in the video game processing system 100 (see FIG. 1). As illustrated in FIG. 2, the server apparatus 10A at least includes a region setting unit 11, a belonging parameter setting unit 12, a propagating unit 13, an indicator setting unit 14, and a storage unit 15.

The region setting unit 11 has a function to set a plurality of regions by grouping movable areas of a character in a virtual space on the basis of a predetermined rule. Here, the character means a character that can actively move among objects that appear in the virtual space, and includes a character that the user can operate (for example, a player character) and a character that the user cannot operate (for example, a non-player character). Further, each of the movable areas means an area in which movement of the character in the virtual space is allowed. A configuration of the movable area is not limited particularly. The movable area may be configured by a 2D map, or may be configured by a 3D map. Further, the region means a predetermined area of the virtual space provided with at least one location where the character can be arranged (or can move). Setting of the arrangeable location may be any type. For example, the region setting unit 11 may be configured so as to set one arrangeable location to one region, or may be configured so that one region includes a plurality of arrangeable locations. For example, in a case where the server apparatus 10A is configured so as to arrange a navigation mesh on the virtual space, each of intersections of the mesh may be an arrangeable location.

The belonging parameter setting unit 12 has a function to set a predetermined value to each of regions at which two or more characters are respectively positioned as a belonging parameter in a case where each of the two or more characters is positioned at any of the regions. Each of the two or more characters respectively belong to different groups in the virtual space. The belonging parameter indicates a belonging group of each of the characters. An absolute value of the belonging parameter becomes the maximum at the predetermined value. Here, the belonging group of each of the characters means a group constructed by at least one characters each of which shares a task in a video game. Namely, the phrase "respectively belong to different groups" means a state that the two or more characters do not share the task in the video game. The belonging parameter means a unique parameter set to each of the belonging groups. The maximum value of an absolute value of each of the belonging parameters is set as an upper limit. In this regard, a positive value may be set to the belonging parameter, or a negative value may be set to the belonging parameter. A belonging parameter with a different absolute value may be set to each of the different belonging groups, or a belonging parameter in Which the maximum value of the absolute value is the same may be set to each of the different belonging groups.

The propagating unit 13 has a function to propagate each of the belonging parameters to any of adjacent regions of the corresponding region so that the absolute value of the belonging parameter decreases by a predetermined value every movement from the corresponding region to the adjacent region. The propagating unit 13 also has a function to set the belonging parameter after decrease to the corresponding region in a case where any other belonging parameter has not been set thereto yet. A way of propagating the belonging parameter can be set appropriately. For example, it can be thought that the belonging parameter is propagated so as to decrease the absolute value thereof by the predetermined value every step over a portion where regions are in contact with each other. The propagating unit 13 causes the belonging parameter not to be propagated to a region to which any belonging parameter has already been set regardless of whether the character belongs to a different group or the same group. Namely, it can be said that this propagating process is a classification process in which a virtual space is classified by a belonging parameter by propagating the belonging parameter from a location of the character. In this regard, the propagating unit 13 may be configured so that propagation velocity can be set appropriately, or may be configured so that velocity is differentiated in accordance with a belonging group.

The indicator setting unit 14 has a function to calculate, as a result of a fact that each of the belonging parameters is propagated, a sum of absolute values of two different belonging parameters in a predetermined region at which a moving number of regions from each of regions at which two characters belonging to different groups are respectively positioned is substantially equal to each other or a boundary of the predetermined region. Propagation of the different belonging parameters encounters each other at the predetermined region or on the boundary of the predetermined region. The indicator setting unit 14 also has a function to set, with respect to a region where the sum of the absolute values satisfies a predetermined condition or a boundary portion of the region, the region, the boundary of the region, or regions adjacent to the boundary of the region as an indicator portion. The indicator portion becomes an indicator of an action of the character. Here, the phrase "propagation of the different belonging parameters encounters" means a state where regions to which different belonging parameters are respectively propagated face each other across one region, or a case where regions to which different belonging parameters are respectively propagated are in contact with each other. Further, the phrase "a predetermined region at Which a moving number of regions from each of regions at which two characters belonging to different groups are respectively positioned is substantially equal to each other" means a region that is positioned between two regions at which moving numbers from regions at which two characters belonging to different groups are respectively positioned are substantially equal to each other. The phrase "a boundary of the predetermined region at which a moving number is substantially equal to each other" means a boundary portion of two regions at which a moving number from each of regions at which two characters belonging to different groups are respectively positioned is substantially equal to each other. The indicator portion may be one to which a region is set, one to which a boundary of a region is set, or one to which one site in a region is set. Further, the predetermined condition for the sum of the absolute values may be any condition so long as the predetermined condition is a condition to which at least one indicator portion can be set. As one example, it can be thought that portions for each of which a sum of absolute values is taken are compared to set one portion with the maximum value as an indicator portion. In this regard, by using the sum of the absolute values to execute the determination, it is possible to determine the indicator portion under the same condition even in a case where signs of belonging parameters are different from each other.

The storage unit 15 has a function to store data necessary for various processes executed by the server apparatus 10A and data obtained as a result of each of the processes.

Figure 3:
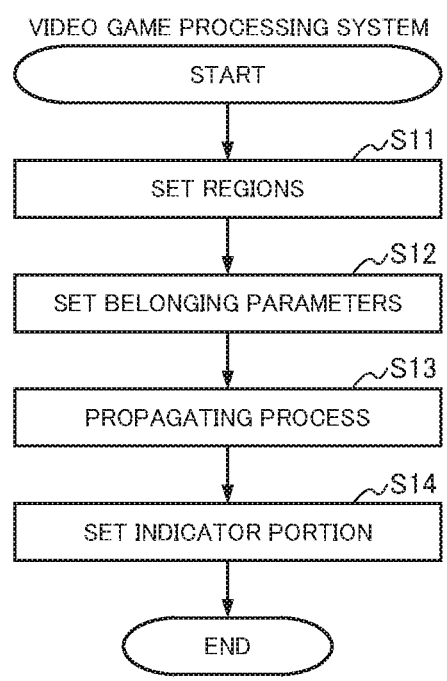
FIG. 3 is a flowchart illustrating an example of game processing corresponding to at least one of the embodiments of the present invention.

Next, a flow of processing executed by the video game processing system 100 (hereinafter, referred to also as the "system 100") according to the present embodiment will be described. FIG. 3 is a flowchart illustrating an example of game processing corresponding to at least one of the embodiments of the present invention.

The game processing is started in a situation that it becomes necessary to set an indicator portion. In the game processing, the video game processing system 100 first sets a plurality of regions (Step S11). Next, the video game processing system 100 sets a predetermined value to each of the regions at which the characters are respectively positioned as a belonging parameter (Step S12). The belonging parameter indicates a belonging group of each of the characters. An absolute value of the belonging parameter becomes maximum at the predetermined value. The video game processing system 100 then propagates each of the belonging parameters to any of adjacent regions of the corresponding region so that the absolute value of the belonging parameter decreases by a predetermined value every movement from the corresponding region to the adjacent region, and sets the belonging parameter after decrease to the corresponding region in a case where any other belonging parameter has not been set thereto yet (Step S13). Finally, the video game processing system 100 calculates a sum of absolute values of two different belonging parameters in a predetermined region at which a moving number of regions from each of regions at which two characters belonging to different groups are respectively positioned is substantially equal to each other or a boundary of the predetermined region in which propagation of the different belonging parameters encounters each other at the predetermined region or the boundary of the predetermined region, sets a region in which the sum of the absolute values satisfies a predetermined condition or a boundary portion of the region as an indicator portion (Step S14), and terminates the processing herein.

Figure 4:
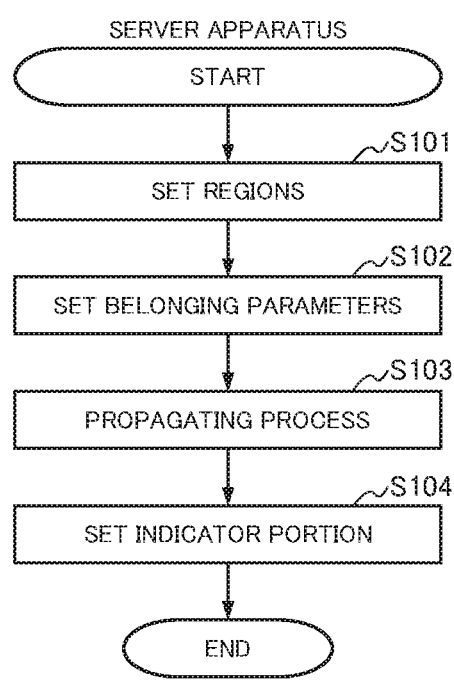
FIG. 4 is a flowchart illustrating an example of an operation of a server side in the game processing corresponding to at least one of the embodiments of the present invention.

FIG. 4 is a flowchart illustrating an example of an operation of a server side in the game processing corresponding to at least one of the embodiments of the present invention. Here, an operation of the server apparatus 10A in the system 100 will be described.

The game processing is started in a situation that it becomes necessary to set an indicator portion. In the game processing, the server apparatus 10A first sets a plurality of regions (Step S101). Next, the server apparatus 10A sets a predetermined value, at which an absolute value of a belonging parameter becomes the maximum, to each of regions at which characters are respectively positioned in a virtual space as the belonging parameter that indicates a belonging group of each of the characters (Step S102). The server apparatus 10A then propagates each of the belonging parameters to any of adjacent regions of the corresponding region so that the absolute value of the belonging parameter decreases by a predetermined value every movement from the corresponding region to the adjacent region, and sets the belonging parameter after decrease to the corresponding region in a case where any other belonging parameter has not been set thereto yet (Step S103). Finally, the server apparatus 10A calculates a sum of absolute values of two different belonging parameters in a predetermined region at which a moving number of regions from each of regions at which two characters belonging to different groups are respectively positioned is substantially equal to each other or a boundary of the predetermined region in which propagation of the different belonging parameters encounters each other at the predetermined region or the boundary of the predetermined region, sets a region in which the sum of the absolute values satisfies a predetermined condition or a boundary portion of the region as an indicator portion (Step S104), and terminates the processing herein.

Figure 5:
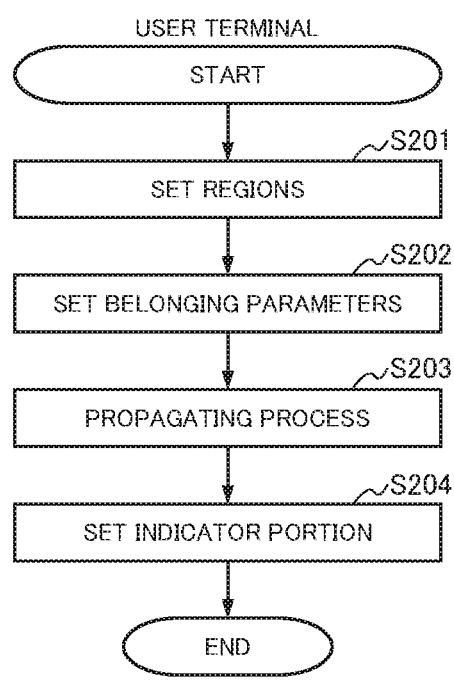
FIG. 5 is a flowchart illustrating an example of an operation of a terminal side in the game processing corresponding to at least one of the embodiments of the present invention.

FIG. 5 is a flowchart illustrating an example of an operation of a terminal side in the game processing corresponding to at least one of the embodiments of the present invention. In this regard, the user terminal 20 is configured so as to include the similar functions to the configuration of the server apparatus 10A except for reception of various kinds of information from the server apparatus 10A. For this reason, its description is omitted from a point of view to avoid repeated explanation.

The game processing is started in a situation that it becomes necessary to set an indicator portion. In the game processing, the user terminal 20 first sets a plurality of regions (Step S201). Next, the user terminal 20 sets a predetermined value, at which an absolute value of a belonging parameter becomes the maximum, to each of regions at which characters are respectively positioned in a virtual space as the belonging parameter that indicates a belonging group of each of the characters (Step S202). The user terminal 20 then propagates each of the belonging parameters to any of adjacent regions of the corresponding region so that the absolute value of the belonging parameter decreases by a predetermined value every movement from the corresponding region to the adjacent region, and sets the belonging parameter after decrease to the corresponding region in a case where any other belonging parameter has not been set thereto yet (Step S203). Finally, the user terminal 20 calculates a sum of absolute values of two different belonging parameters in a predetermined region at which a moving number of regions from each of regions at which two characters belonging to different groups are respectively positioned is substantially equal to each other or a boundary of the predetermined region in which propagation of the different belonging parameters encounters each other at the predetermined region or the boundary of the predetermined region, sets a region in which the sum of the absolute values satisfies a predetermined condition or a boundary portion of the region as an indicator portion (Step S204), and terminates the processing herein.

As explained above, as one side of the first embodiment, the server apparatus 10A is configured so as to include the region setting unit 11, the belonging parameter setting unit 12, the propagating unit 13, and the indicator setting unit 14. Thus, the region setting unit 11 sets the plurality of regions by grouping the movable areas of the character in the virtual space on the basis of the predetermined rule; the belonging parameter setting unit 12 set the predetermined value to each of regions at which the two or more characters are respectively positioned as the belonging parameter in a case where each of the two or more characters is positioned at any of the regions; the propagating unit 13 propagates each of the belonging parameters to any of adjacent regions of the corresponding region so that the absolute value of the belonging parameter decreases by the predetermined value every movement from the corresponding region to the adjacent region, and sets the belonging parameter after decrease to the corresponding region in a case where any other belonging parameter has not been set thereto yet; and the indicator setting unit 14 calculates, as a result of a fact that each of the belonging parameters is propagated, the sum of the absolute values of the two different belonging parameters in the predetermined region at which the moving number of regions from each of regions at which the two characters belonging to different groups are respectively positioned is substantially equal to each other or the boundary of the predetermined region, propagation of the different belonging parameters encountering each other at the predetermined region or on the boundary of the predetermined region, and sets, with respect to the region where the sum of the absolute values satisfies the predetermined condition or a boundary portion of the region, the region, the boundary of the region, or the regions adjacent to the boundary of the region as the indicator portion, the indicator portion becoming the indicator of the action of the character. Therefore, it becomes possible to execute setting of an indicator suitable to cause a character other than an operation target of the user to carry out an action along a purpose.

In this regard, it has not been mentioned particularly in the first embodiment described above. However, timing when the region setting unit 11 executes the process is not limited particularly. The server apparatus 10A may be configured so as to execute the processes at the time when the video game is developed or at the time when the video game is played. Namely, the server apparatus 10A may be configured so as to read out information on regions that are generated before the player plays the video game, and execute the processes on the basis of the read-out information on the regions.

Second Embodiment

Figure 6:
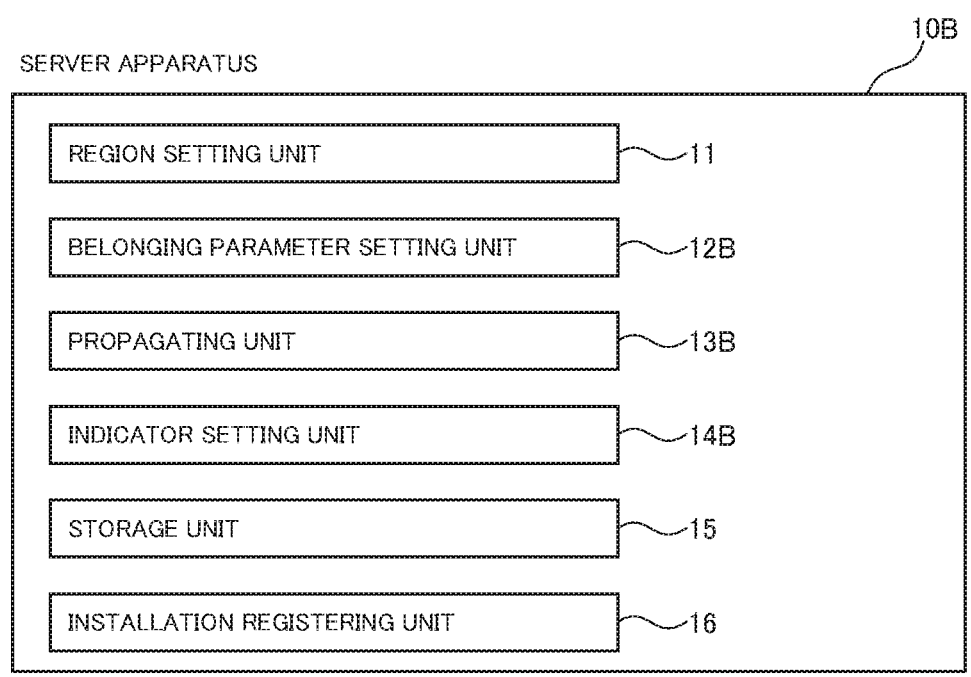
FIG. 6 is a block diagram illustrating a configuration of a server apparatus corresponding to at least one of the embodiments of the present invention.

FIG. 6 is a block diagram illustrating a configuration of a server apparatus 10B, which is an example of the server apparatus 10 in the video game processing system 100 (see FIG. 1) corresponding to at least one of the embodiments of the present invention. As illustrated in FIG. 6, the server apparatus 10B at least includes a region setting unit 11, a belonging parameter setting unit 12B, a propagating unit 13B, an indicator setting unit 14B, a storage unit 15, and an installation registering unit 16, In this regard, a case where the belonging parameter setting unit 129, the propagating unit 13B, and the indicator setting unit 14B respectively have function described below in addition to the functions with which the belonging parameter setting unit 12, the propagating unit 13, and the indicator setting unit 14 according to the first embodiment are provided will be described.

The installation registering unit 16 has a function to register, in a case where an object that exerts an effect on a character belonging to a different group is installed in any region on the basis of an action of a character, installation of the object in a predetermined position within the region.

Here, the phrase "an object that exerts an effect on a character belonging to a different group" means an object that is set so as to exert a predetermined effect on a character belonging to another group in a video game. For example, such an object includes an item such as a trap, which has an effect to capture an enemy character, or an effect to cause damage to an enemy character. In a case where an object is installed on the basis of an action of the character, installation of the object in the position is registered.

The belonging parameter setting unit 12B has a function to set a predetermined value to the region where the registered object is installed as a belonging parameter of a character belonging to a different group from that of the installed character.

The propagating unit 13B has a function to also propagate the belonging parameter from the region where the object is installed. In this regard, it is preferable that timing when installation of the object is registered is set to timing when the indicator position is reset. Namely, the belonging parameter is propagated from both each of the characters and the corresponding object at the same time.

The indicator setting unit 14B has a function to determine a region at which propagation of the belonging parameter that is propagated from the region where the object is installed also encounters or a boundary of the region to execute setting of the indicator portion.

Figure 7:
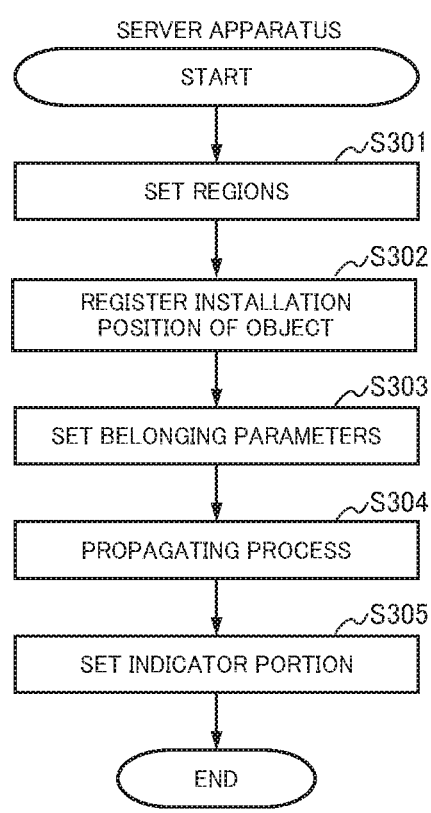
FIG. 7 is a flowchart illustrating an example of an operation of a server side in game processing corresponding to at least one of the embodiments of the present invention.

FIG. 7 is a flowchart illustrating an example of an operation of a server side in game processing corresponding to at least one of the embodiments of the present invention. Here, an operation of the server apparatus 10B in the video game processing system 100 will be described.

The game processing is started in a situation that it becomes necessary to set an indicator portion. In the game processing, the server apparatus 10B first sets a plurality of regions (Step S301), Next, the server apparatus 10B registers, in a case where an object is installed by a character, an installation position of the object (Step S302). Next, the server apparatus 10B sets a predetermined value, at which an absolute value of a belonging parameter becomes the maximum, to each of regions at which characters are respectively positioned in a virtual space as a belonging parameter that indicates a belonging group of each of the characters (Step S303). At this time, a belonging parameter different from that of the character that installs the object is set to the region where the object is installed. The server apparatus 10B then propagates each of the belonging parameters to any of adjacent regions of the corresponding region so that the absolute value of the belonging parameter decreases by a predetermined value every movement from the corresponding region to the adjacent region, and sets the belonging parameter after decrease to the corresponding region in a case where any other belonging parameter has not been set thereto yet (Step S304). In this propagating process, the belonging parameter is also propagated from the region where the object is installed. Finally, the server apparatus 10B calculates a sum of absolute values of two different belonging parameters in a predetermined region at which a moving number of regions from each of regions at which two characters belonging to different groups are respectively positioned is substantially equal to each other or a boundary of the predetermined region in which propagation of the different belonging parameters encounters each other at the predetermined region or the boundary of the predetermined region, sets a region in which the sum of the absolute values satisfies a predetermined condition or a boundary portion of the region as an indicator portion (Step S305), and terminates the processing herein.

As explained above, as one side of the second embodiment, the server apparatus 10B is configured so as to include the region setting unit 11, the belonging parameter setting unit 12B, the propagating unit 13B, the indicator setting unit 14B, the storage unit 15, and the installation registering unit 16. Thus, the installation registering unit 16 registers, in a case Where the object that exerts the effect on the character belonging to the different group is installed in any region on the basis of the action of the character, installation of the object in the predetermined position within the region; the belonging parameter setting unit 12B sets the predetermined value to the region where the registered object is installed as the belonging parameter of the character belonging to the different group from that of the installed character; the propagating unit 13B also propagates the belonging parameter from the region where the object is installed; and the indicator setting unit 14B determines the region at which propagation of the belonging parameter that is propagated from the region where the object is installed also encounters or a boundary of the region to execute setting of the indicator portion. Therefore, it becomes possible to change the indicator portion on the basis of the object in which the character is installed.

Third Embodiment

Figure 8:
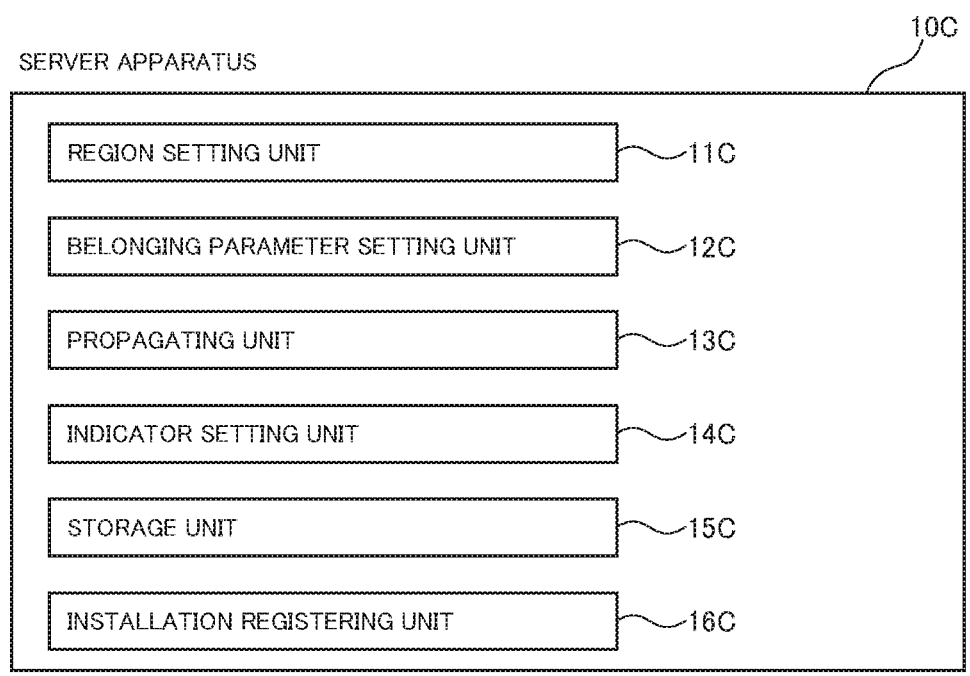
FIG. 8 is a block diagram illustrating a configuration of a server apparatus corresponding to at least one of the embodiments of the present invention.

FIG. 8 is a block diagram illustrating a configuration of a server apparatus 10C, which is an example of the server apparatus 10 in the video game processing system 100 (see FIG. 1). In the present embodiment, the server apparatus 10C at least includes a region setting unit 11C, a belonging parameter setting unit 12C, a propagating unit 13C, an indicator setting unit 14C, a storage unit 15C, and an installation registering unit 16C. In this regard, in the present embodiment, a case where the server apparatus 10C mainly executes processes will be described, but this is just one example. The video game processing system 100 may be configured so that a user terminal mainly executes the processes, or may be configured so that the processes are performed by executing a program on the user terminal under offline environment.

The region setting unit 11C has a function to set a plurality of regions by grouping movable areas of a character in a virtual space on the basis of a predetermined rule.

The belonging parameter setting unit 12C has a function to set a predetermined value to each of regions at which two or more characters are respectively positioned as a belonging parameter in a case where each of the two or more characters is positioned at any of the regions. Each of the two or more characters respectively belong to different groups in the virtual space. The belonging parameter indicates a belonging group of each of the characters. An absolute value of the belonging parameter becomes the maximum at the predetermined value. Further, the belonging parameter setting unit 12C has a function to set a predetermined value as a belonging parameter of a character belonging to a different group from a of the character a is installed in a region where a registered object is installed.

The propagating unit 13C has a function to propagate each of the belonging parameters to any of adjacent regions of the corresponding region so that the absolute value of the belonging parameter decreases by a predetermined value every movement from the corresponding region to the adjacent region. The propagating unit 13 also has a function to set the belonging parameter after decrease to the corresponding region in a case where any other belonging parameter has not been set thereto yet. Further, the propagating unit 13C also has a function to propagate the belonging parameter from the region where the object is installed.

The indicator setting unit 14C has a function to calculate, as a result of a fact that each of the belonging parameters is propagated, a sum of absolute values of two different belonging parameters in a predetermined region at Which a moving number of regions from each of regions at which two characters belonging to different groups are respectively positioned is substantially equal to each other or a boundary of the predetermined region. Propagation of the different belonging parameters encounters each other at the predetermined region or on the boundary of the predetermined region. The indicator setting unit 14 also has a function to set, with respect to a region where the sum of the absolute values satisfies a predetermined condition or a boundary portion of the region, the region, the boundary of the region, or regions adjacent to the boundary of the region as an indicator portion. The indicator portion becomes an indicator of an action of the character. Further, the indicator setting unit 14C also has a function to determine a region at which propagation of the belonging parameter that is propagated from the region where the object is installed also encounters or a boundary of the region to execute setting of the indicator portion. Moreover, the indicator setting unit 14C has a function to determine a region or a boundary portion of the region at which the sum of the absolute values calculated in the region at which propagation of the different belonging parameters encounters each other or a boundary of the region becomes the maximum, and set the region, the boundary of the region, or regions adjacent to the boundary of the region as the indicator portion becoming the indicator of the action of the character.

The storage unit 15C has a function to store data necessary for various processes executed by the server apparatus 10C and data obtained as a result of each of the processes.

The installation registering unit 16C has a function to register, in a case where an object that exerts an effect on a character belonging to a different group is installed in any region on the basis of an action of a character, installation of the object in a predetermined position within the region.

Figure 9:
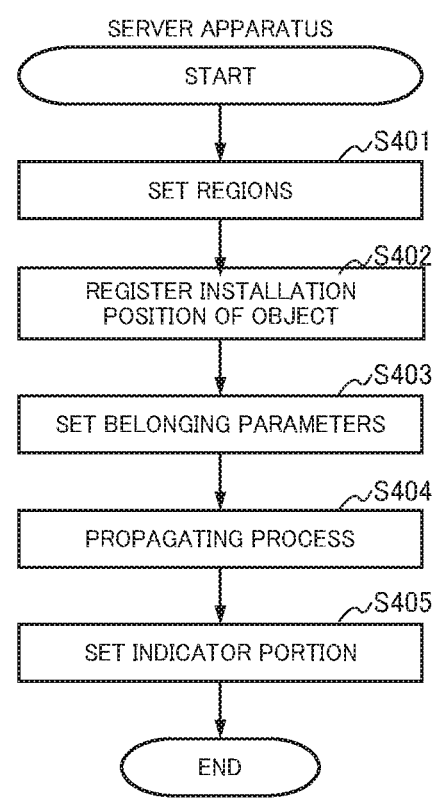
FIG. 9 is a flowchart illustrating an example of an operation of a server side in game processing corresponding to at least one of the embodiments of the present invention.

FIG. 9 is a flowchart illustrating an example of an operation of a server side in game processing corresponding to at least one of the embodiments of the present invention. Here, an operation of the server apparatus 10C in the video game processing system 100 will be described.

The game processing is started in a situation that it becomes necessary to set an indicator portion. In the game processing, the server apparatus 10C first sets a plurality of regions (Step S401), Next, the server apparatus 10C registers, in a case where an object is installed by a character, an installation position of the object (Step S402). Next, the server apparatus 10C sets a predetermined value, at which an absolute value of a belonging parameter becomes the maximum, to each of regions at which characters are respectively positioned in a virtual space as a belonging parameter that indicates a belonging group of each of the characters (Step S403). At this time, a belonging parameter different from that of the character positioned that installs the object is set to the region where the object is installed. The server apparatus 10C then propagates each of the belonging parameters to any of adjacent regions of the corresponding region so that the absolute value of the belonging parameter decreases by a predetermined value every movement from the corresponding region to the adjacent region, and sets the belonging parameter after decrease to the corresponding region in a case where any other belonging parameter has not been set thereto yet (Step S404). In this propagating process, the belonging parameter is also propagated from the region where the object is installed. Finally, the server apparatus 10C calculates a sum of absolute values of two different belonging parameters in a predetermined region at which a moving number of regions from each of regions at which two characters belonging to different groups are respectively positioned is substantially equal to each other or a boundary of the predetermined region in which propagation of the different belonging parameters encounters each other at the predetermined region or the boundary of the predetermined region, sets a region in which the sum of the absolute values satisfies a predetermined condition or a boundary portion of the region as an indicator portion (Step S405), and terminates the processing herein.

Figure 10:
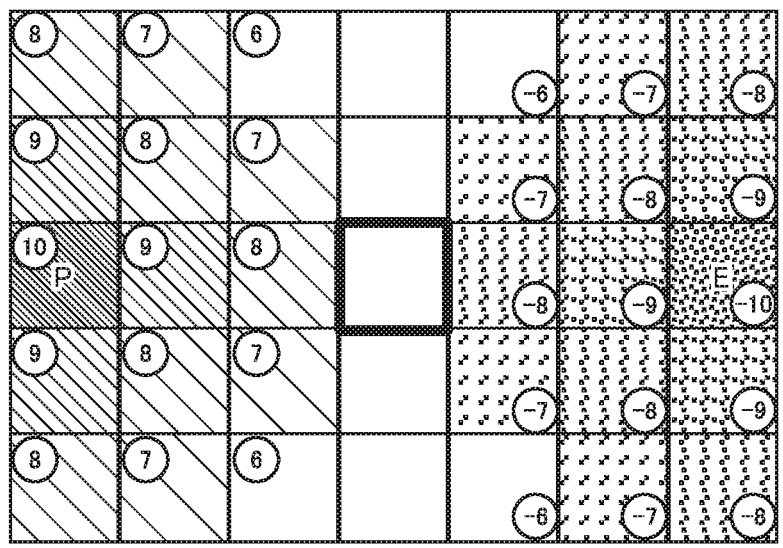
FIG. 10 is an explanatory drawing for explaining indicator setting corresponding to at least one of the embodiments of the present invention.
Figure 11:
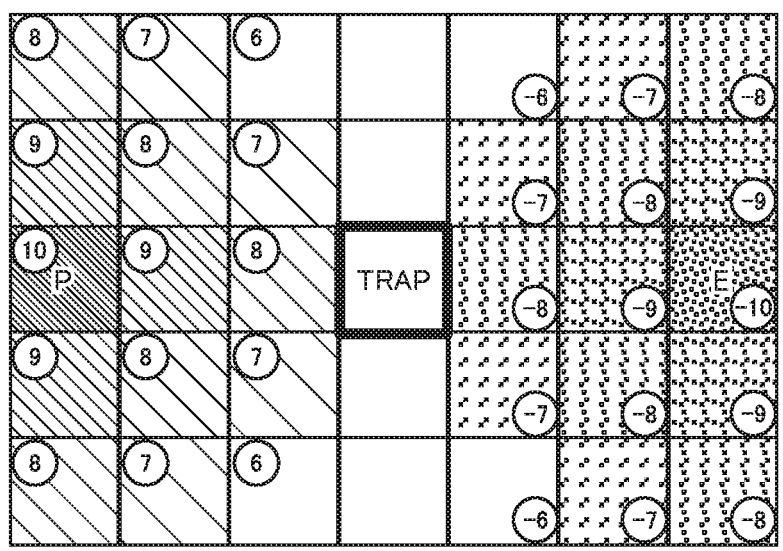
FIG. 11 is an explanatory drawing for explaining indicator setting corresponding to at east one of the embodiments of the present invention.
Figure 12:
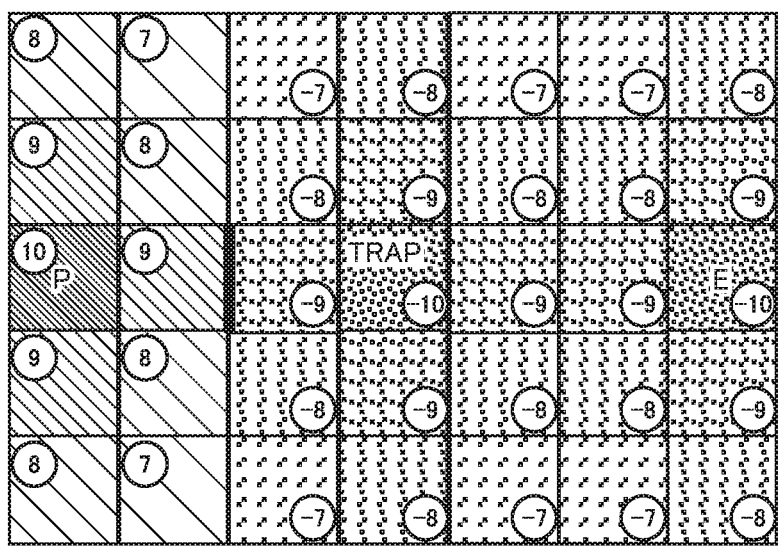
FIG. 12 is an explanatory drawing for explaining indicator setting corresponding to at least one of the embodiments of the present invention.

FIG. 10 to FIG. 12 are explanatory drawings for explaining indicator setting corresponding to at least one of the embodiments of the present invention. In FIG. 10 to FIG. 12, for simplification of description, squares with the same size, each of which is divided in a grid pattern, are regarded as regions set by the region setting unit 11C. However, the regions are actually set appropriately in accordance with a topographical condition or the like of a virtual space in a video game.

In FIG. 10, a reference numeral "P" indicates a position of a player character, and a reference numeral "E" indicates a position of an enemy character. The player character and the enemy character are characters that belong to different groups. In such a situation, the belonging parameter setting unit 12C respectively sets different belonging parameters to a region in which "P" is positioned and a region in which "E" is positioned. In the example illustrated in FIG. 10, "10" is set to the region of "P" as the belonging parameter of the player character, and "−10" is set to the region of "E" as the belonging parameter of the enemy character. Next, the set belonging parameter is propagated. Each of the belonging parameters propagates so that an absolute value of the belonging parameter is decreased by one every movement from the corresponding region to the adjacent region. When this propagating process is completed in FIG. 10, all regions in one column arranged just in the center of the grid pattern become a region where propagation of the different belonging parameters encounter each other. In each of the regions on this one column, a sum of the absolute values of the two different belonging parameters that encounter each other is calculated. A region where the sum of the absolute values obtained in this manner satisfies a predetermined condition is set as an indicator portion. As one example of the predetermined condition, in a case where only one region where the sum of the absolute values become the maximum is set as an indicator portion, only one region in the center thereof is set as the indicator portion.

Next, as illustrated in FIG. 11, the player character installs a trap in the region set as the indicator portion, and returns to an original position thereof. Here, the trap is one example of an object that exerts an effect on a character belonging to a different group. When the trap is installed, the indicator portion is reset. When the trap is installed, a belonging parameter is also set to the position where the trap is installed on the basis of the function of the belonging parameter setting unit 12C. As the belonging parameter set to this position in which the trap is installed, the belonging parameter of the enemy character belonging to the different group from that of the player, which installs the trap, is set.

Then, when the propagating process is executed on the basis of the belonging parameter with "−10", which is set to the central position in which the trap is installed, as illustrated in FIG. 12, "−10" is set to a position near the region in which the player character is positioned. For this reason, a portion at which propagation of the different belonging parameters encounters each other moves to a side nearer the player character. Among the regions each of which propagation of these different belonging parameters encounters each other, the region in which the sum of the absolute values is the largest becomes a boundary portion at which "9" and "−9" are in contact with each other. Therefore, the indicator portion is set to this boundary or the regions adjacent to the boundary. As a result, by installing the trap, the indicator portion moves from the indicator portion illustrated in FIG. 10 to the indicator portion illustrated in FIG. 12.

Here, a more specific situation will be described. Hereinafter, as one example of the video game in which the indicator setting according to the present embodiment is executed, a case where a navigation mesh is set to the virtual space in a 3D cover shooting game in which a soldier or a weapon appears and setting of a region is further executed will be described as an example.

In the present embodiment, an enemy soldier is allowed to search a player from an edge of a map. Further, the enemy soldier can fight with the player anywhere on the map. For that reason, normal movement such as walking or running is carried out on the navigation mesh.

Here, in order to perform functions of the enemy soldier, the server apparatus 10C that controls the video game can search a long and large path from an edge of a map to an opposite edge. In the present embodiment, in order to suppress a search load for a path, a hierarchical type path search is executed. Further, the enemy soldier can go not only to the vicinity of an arranged position but also to a location where the player can go. Namely, the enemy soldier can get over or climb a cover, or move via any of a door, a window, and a ladder. In the present embodiment, in order to secure a degree of freedom of movement, each of the player and the enemy soldier is caused to pass through a location at which the navigation mesh is not continuous by means of a jump link.

Further, in the present embodiment, as functions regarding navigation, movement of a contiguous portion by a navigation mesh (hereinafter, referred to also as a "NavMesh"), movement outside the mesh by a jump link, a hierarchical structure for reducing a search load for a long and large path, and a function to automatically generate data described above will also be described.

Here, as examples of geomorphic expression used for the functions described above, there are a NavMesh, waypoints, a connection graph, and an upper layer graph based on the waypoints.

The NavMesh uses a known technique (for example, recast navigation). Therefore, its detailed explanation herein is omitted. In this regard, in the present embodiment, setting of a passable flag to polygons contiguous from a player initial position, and the like are executed. Since the player can climb a wall with a certain height, a passable flag is also set to polygons that are not contiguous from the player initial position but contiguous from the wall that climbed by the player. In this case, for example, a mesh provided in the vicinity of a position shifted by a height, which can be climbed from an edge where there are no adjacent polygons, is searched. If there is a corresponding mesh, a contiguous flag is set therefrom.

Next, a plurality of waypoints is arranged on the set navigation mesh in accordance with a predetermined arrangement rule. Hereinafter, a case where waypoints are automatically arranged on the NavMesh offline will be described as an example.

Here, the waypoint plays a role as a base in Which information necessary for a video game is embedded. In the present embodiment, information, such as a XYZ position, a NavMesh polygon ID under a point, LOF (Line of Fire), a point attribute, point connection information, an adjacent cover ID, an adjacent door ID, an adjacent ladder/window ID, a shooting cover list, a height from a point location to a ceiling, a height when to get over an adjacent cover, a distance to a wall, or a broken gimmick ID riding on a point, is associated with the waypoint if needed.

Further, in the present embodiment, by arranging points by means of a flood fill algorithm (Floodfill) on the basis of the player initial position, the waypoints are automatically arranged. In this regard, the points may not be formed at required positions due to a grid shape. Therefore, it may be configured so as to add points arbitrarily. In this case, it may be configured so as to receive addition of a waypoint to a location of each of various kinds of objects (for example, a door, a low cover, an edge of a high cover, and a position at which a ladder is installed) in the virtual space.

In this regard, some waypoints, which are selected in accordance with a predetermined selection rule, may be thinned out from the plurality of waypoints thus arranged. Hereinafter, a case where waypoints are thinned out as a process after the waypoints are spread all over will be described as an example. In this regard, it is preferable that an index after thinning out falls within 16 bits. This is because the index of the point should not be increased because it is to be stored here and there. Further, in a case where the number of indexes is large, a load at the time of search thereof increases too much.

In the present embodiment, by selecting points in a random manner after automatically arranging a plurality of waypoints on the basis of a player initial position, the arranged waypoints are thinned out. Further, in the present embodiment, some points that should not be thinned out are not thinned out. Namely, for example, in a case where a waypoint corresponding to a point where a distance between positions before and after thinning out the waypoint is too wide, a point where a graph is cut by thinning out the waypoint, a point that becomes a too roundabout route by thinning out the waypoint, a boundary of an upper layer graph node, a location that becomes a trigger of an action such as a door, or the like is selected, the corresponding waypoint is not thinned out.

A moving route of the object is searched on the basis of arrangement of the plurality of waypoints after thinning out some waypoints. Hereinafter, a case where a route search for a route from a start point to an end point, such as a route from an enemy's position to a player's position, a route from an enemy's position to a target object, or a route from a player's position to a position selected by the player, is performed by using a known route search technique in which arranged waypoints are used as route candidate locations will be described as an example.

A plurality of regions is set by grouping the plurality of waypoints (or a navigation mesh) arranged in the virtual space in accordance with a predetermined classification rule. Hereinafter, a case where regions in which points close in position are got together to an extent and labeled (AI regions) are generated as a structure of an uppermost layer for a hierarchical type path search will be described as an example. In this regard, information on point connection of a label boundary is used as connection information.

In the present embodiment, the AI region plays a role of dealing with points as a certain level of lump. It is preferable that the AI region is configured so as to roughly express a position without being too detailed. Further, the AI region also has a role as a cost-added target that prevents the object from passing through the same path. The AI region can also be utilized for a map of a degree of influence between a player and an enemy (influence map) and the like. Moreover, it is possible to expect that the AI region allows a search load for a path to be reduced by hierarchization of positional representation.

in a case where a region (that is, an AI region according to the present embodiment) is generated from a landform, waypoints are spread all over the landform; adjacent waypoints are connected to each other; a distance from a corresponding wall is set for each of the waypoints; and the set distance is divided by a watershed (Watershed) algorithm, whereby it becomes possible to divide the region automatically. Further, in the present embodiment, the generated regions are adjusted on the basis of a predetermined adjustment rule. Namely, regions each of which satisfies a predetermined division condition are divided from the plurality of regions, and a region that satisfies a predetermined merge condition is merged with another region. By configuring it in this manner, each of too small regions is attached to an adjacent large region, and a too large region is repeatedly cut so that "a long side thereof is cut into half". By forming the regions so as to have a certain size in this manner, it is possible to roughly deal with them as "units".

Regions where an object is allowed to move (that is, "movable regions") are determined on the basis of arrangement of the plurality of regions thus generated. By using the set regions in this manner, for example, it becomes possible to utilize a known route search technique by using the respective regions as nodes.

As described above, the data are created in the order of a NavMesh, a waypoint graph, and an upper layer graph, and this makes it possible to perform a path search in the order of the upper layer graph, the waypoint graph, and the NavMesh.

In this regard, the moving route finally desired by the path search is a smooth moving route to an extent intended by a designer of the video game. Namely, it is preferable that it is configured so that a Bezier curve, a straight line, or a line that requires an action because a line from a current position of an object to a target position is not contiguous can be derived in accordance with a type of the object. In the present embodiment, by specifying an action and a position required in an upper layer graph level, specifying an action and a position required in a waypoint level, and searching a moving route on which the object continuously moves between the specified positions, various kinds of lines can be derived. In this regard, a route for contiguous (or continuous) movement can be derived by passing through an upper layer path, creating a path of waypoints in an upper layer node, connecting waypoints of all nodes, creating a NavMesh polygon list along a point path, creating a list of edges through which the object passes, and creating a Bezier curve by using an intermediate point of the edges.

Further, the region generated by the above method can be utilized for setting of the indicator portion. In the 3D cover shooting game in which the soldier or the weapon appears, a "front line" may be set as a portion where a friend region faces competition with an enemy region. For setting of the "front line", the indicator setting according to the present embodiment can be applied. Namely, a belonging parameter of the player character and a belonging parameter of the enemy character are caused to propagate from respective staying regions; the sum of absolute values is obtained in a portion where two different belonging parameters encounter each other; and a portion where the sum of the absolute values becomes the largest is set to the "front line". In this regard, in a case where a plurality of characters belonging to the same group exists, belonging parameters may be respectively set to staying positions of all of the characters to execute a propagating process, or a propagating process may be executed by using a staying position of a leader belonging to the same group (that is, a staying position of one representative character) as a setting position of the belonging parameter. Alternatively, a propagating process may be executed by using a representative base portion belonging to the same group (for example, a base can be set) as a setting position of the belonging parameter. It is determined that an NPC as a friend of the player character or an NPC as the enemy character is controlled so as to act with room to an extent so that a region to Which a belonging parameter corresponding to its own belonging group is its own belonging region. However, when moving beyond the region of the front line to a region to which a belonging parameter different from its own belonging parameter is set, a control is executed so that a character acts under the tension that the character does not know when to face an opponent character or the character does not know when the character will be shot. In this regard, setting of the front line may be made by fixing a position set for a certain period of time after having been set once to control progress of the video game, or may be configured so that the position of the front line is also changed in accordance with movement of the character. Further, it can be said that a battle is likely to occur at the position of the "front line". Therefore, in a case where an automatic control for the NPC is executed and a task to shoot the enemy (for example, the player character) is given thereto, it can be though that the NPC is controlled so as to go toward the front line As described above, it is possible to act with room in a group of regions to which the belonging parameter corresponding to its own belonging group (that is, regions in front of the front line when viewed from the player character). However, it can be said that a group of regions to which the belonging parameter different from that of its own belonging group is set (that is, regions behind the front line when viewed from the player character) is regions that the player character should not enter if possible because a risk that the player character is attacked increases therein. Therefore, even though a player thinks to set up a trap for the enemy character, it is not easy to install the trap after the player character reaches an enemy region. However, there has been a problem that the enemy character would not fall into a trap even though the trap is installed in a friend region. On the other hand, a control to cause the enemy character to directly go to the trap cannot be adopted because this is too unnatural and the player thereby has a feeling of strangeness.

Therefore, in a case where an object that exerts an effect on a character belonging to the other group, such as a trap, is installed in any region, a belonging parameter of a different belonging group from the character that installed the trap in the region is set to the region, and the belonging parameter is also caused to propagate from a position of the trap. As a result, for example, in a case where the player character installs the trap in its own belonging region (that is, the region in front of the front line when viewed from the player character), the region is changed so that the regions to which the enemy character belongs is expanded to the position of the trap. Since the own region to which the enemy character belongs is a region where the enemy character can search with room, there is a possibility that the enemy character may move to the position of the trap as a result of a search action and fall into the trap. Thus, it becomes possible to naturally produce an effect that the enemy character falls into the trap. In this regard, a condition for setting the belonging parameter to the region where the trap is installed may be a condition that the character that installed the trap is separated (or retracted) from the trap by a predetermined distance or longer. By setting such a condition, it is possible to avoid a situation where the character that installed the trap penetrates into the region to which the other character belongs immediately after the trap is installed from occurring.

As explained above, as one side of the third embodiment, the server apparatus 10C is configured so as to include the region setting unit 11C, the belonging parameter setting unit 12C, the propagating unit 13C, the indicator setting unit 14C, the storage unit 15C, and the installation registering unit 16C. Thus, the installation registering unit 16C registers, in a case where the object that exerts the effect on the character belonging to the different group is installed in any region on the basis of the action of the character, installation of the object in the predetermined position within the region; the belonging parameter setting unit 12C sets the predetermined value as the belonging parameter of the character belonging to the different group from that of the character that is installed in the region where the registered object is installed; the propagating unit 13C propagates the belonging parameter from the region where the object is installed; and the indicator setting unit 14C determines the region at which propagation of the belonging parameter that is propagated from the region where the object is installed also encounters or the boundary of the region to execute setting of the indicator portion, further determines the region or the boundary portion of the region at which the sum of the absolute values calculated in the region at which propagation of the different belonging parameters encounters each other or the boundary of the region becomes the maximum, and sets the region, the boundary of the region, or the regions adjacent to the boundary of the region as the indicator portion becoming the indicator of the action of the character. Therefore, it becomes possible to change the indicator portion on the basis of the object in which the character is installed.

In this regard, as the example of the third embodiment, in a case where the object that exerts the effect on the other character belonging to the other group, such as the trap, is installed in any region, the belonging parameter of the belonging group different from that of the character that installs the object is set to the region where the object is installed, and the belonging parameter is also caused to propagate from the position of the object. However, the present invention is not limited to this. For example, the belonging parameter setting unit 12C may be configured so as to directly set a belonging parameter that is not caused to propagate to regions within a predetermined area from the region where the object is installed, and set the regions within the predetermined area from the region where the object is installed to regions of the character belonging to a different group from that of the character that directly installs the object. Namely, even though the propagating process is not executed, by configuring the server apparatus 10C so that the regions within the predetermined area from the position of the object are always changed into the regions of the character belonging to the different group from that of the character that installs the object, it also becomes possible to change the indicator portion on the basis of the object in which the character is installed.

In this regard, as the examples of the first to third embodiments, it has been explained that when the predetermined value, at which the absolute value of the belonging parameter becomes the maximum, is set to the region where the character is positioned as the belonging parameter that indicates the belonging group of each of the characters, the belonging parameter with the different absolute value may be set to each of the different belonging groups, or the belonging parameter in which the maximum value of the absolute value is the same may be set to each of the different belonging groups. Here, by configuring the server apparatus 10A, 10B, or 10C so that the belonging parameter with the different absolute value is set to each of the different belonging groups, it becomes possible to intentionally bring the indicator position closer to any of the belonging groups. By using this, it becomes possible to express characteristics of the belonging group, such as influence of the belonging group, strength thereof, or whether the belonging group is warlike or not, for example, and express a relation between the belonging groups.

In this regard, as the examples of the first to third embodiments, it has been explained that the predetermined value, at which the absolute value of the belonging parameter becomes the maximum, is set to the region where the character is positioned, and the value obtained by decreasing the predetermined value is set each time the character moves to an adjacent region and the belonging parameter is caused to propagate thereto. However, the present invention is not limited to this. The server apparatus 10A, 10B, or 10C can also be configured so that by reversing the number of the value, a predetermined value at which the absolute value of a belonging parameter becomes the minimum, (may be zero) is set to the region where the character is positioned as the belonging parameter that indicates the belonging group of each of the characters, and a value obtained by increasing the predetermined value is set each time the character moves to an adjacent region and the belonging parameter is caused to propagate thereto.

As explained above, one or two or more shortages can be solved by each of the embodiments according to the present application. In this regard, the effects by each of the embodiments are non-limiting effects or one example of the non-limiting effects.

In this regard, in each of the embodiments described above, each of the plurality of user terminals 201 to 20n and the server apparatus 10 executes the various kinds of processing described above in accordance with various kinds of control programs (for example, a video game processing program) stored in the storage device with which the corresponding terminal or server is provided.

Further, the configuration of the video game processing system 100 is not limited to the configuration that has been explained as an example of each of the embodiments described above. For example, the video game processing system 100 may be configured so that the server apparatus 10 executes a part or all of the processes that have been explained as the processes executed by the user terminal 20, Alternatively, the video game processing system 100 may be configured so that any of the plurality of user terminals 201 to 20n executes a part or all of the processes that have been explained as the processes executed by the server apparatus 10. Further, the video game processing system 100 may be configured so that a part or all of the storage unit included in the server apparatus 10 is included in any of plurality of user terminals 201 to 20n. Namely, the video game processing system 100 may be configured so that a part or all of the functions of any one of the user terminal 20 and the server apparatus 10 according to the video game processing system 100 is included in the other.

Further, the video game processing system 100 may be configured so that the program causes a single apparatus to perform a part or all of the functions that have been explained as the example of each of the embodiments described above without including a communication network.

APPENDIX

The explanation of the embodiments described above has been described so that the following inventions can be at least performed by a person having a normal skill in the art to which the present invention belongs.

(1) A non-transitory computer-readable medium including a video game processing program for causing a server to perform functions to control progress of a video game, the functions comprising:

a region setting function configured to set a plurality of regions by grouping movable areas of a character in a virtual space on a basis of a predetermined rule;

a belonging parameter setting function configured to set, in a case where each of two or more characters respectively belonging to different groups in the virtual space is positioned at any of the regions, a predetermined value to each of the regions at Which the characters are respectively positioned as a belonging parameter, the belonging parameter indicating a belonging group of each of the characters, an absolute value of the belonging parameter becoming maximum at the predetermined value;

a propagating function configured to propagate each of the belonging parameters to any of adjacent regions of the corresponding region so that the absolute value of the belonging parameter decreases by a predetermined value every movement from the corresponding region to the adjacent region, the propagating function being configured to set the belonging parameter after decrease to the corresponding region in a case where any other belonging parameter has not been set thereto yet; and an indicator setting function configured to calculate, as a result of a fact that each of the belonging parameters is propagated, a sum of absolute values of two different belonging parameters in a predetermined region at which a moving number of regions from each of regions at which two characters belonging to different groups are respectively positioned is substantially equal to each other or a boundary of the predetermined region, propagation of the different belonging parameters encountering each other at the predetermined region or on the boundary of the predetermined region, the indicator setting function being configured to set, with respect to a region where the sum of the absolute values satisfies a predetermined condition or a boundary portion of the region, the region, the boundary of the region, or regions adjacent to the boundary of the region as an indicator portion, the indicator portion becoming an indicator of an action of the character.

(2) The non-transitory computer-readable medium according to (1), wherein the functions further include:

an installation registering function configured to register, in a case where an object that exerts an effect on the characters respectively belonging to the different groups is installed in any of the regions on a basis of an action of the character, installation of the object to a predetermined position in the corresponding region, wherein the belonging parameter setting function is configured to set the predetermined value as the belonging parameter of the character belonging a different group from that of the character installed in the region in which the object is installed, wherein the propagating function is configured to also propagate the belonging parameter from the region in which the object is installed, and wherein the indicator setting function is configured to determine the region at which propagation of the belonging parameters propagated from the region in which the object is installed encounter each other or a boundary of the region, and execute setting of the indicator portion.

(3) The non-transitory computer-readable medium according to (1) or (2), wherein the indicator setting function is configured to determine a region or a boundary portion of the region at which the sum of the absolute values calculated in the region at which propagation of the different belonging parameters encounters each other or a boundary of the region becomes the maximum, and set the region, the boundary of the region, or regions adjacent to the boundary of the region as the indicator portion becoming the indicator of the action of the character.

(4) The non-transitory computer-readable medium according to any one of (1) to (3), wherein the region setting function is configured to set the plurality of regions so that a size of each of the plurality of regions becomes substantially equal to each other.

(5) A non-transitory computer-readable medium including a video game processing program for causing a user terminal to perform at least one function of the functions that the video game processing program described in any one of (1) to (4) causes the server to perform, the user terminal being capable of communicating with the server.

(6) A server into which the video game processing program described in any one of (1) to (5) is installed.

(7) A video game processing system for executing a process to control progress of a video game, the video game processing system comprising a communication network, a server, and a user terminal, the video game processing system comprising:

a region setting unit configured to set a plurality of regions by grouping movable areas of a character in a virtual space on a basis of a predetermined rule;

a belonging parameter setting unit configured to set, in a case where each of two or more characters respectively belonging to different groups in the virtual space is positioned at any of the regions, a predetermined value to each of the regions at which the characters are respectively positioned as a belonging parameter, the belonging parameter indicating a belonging group of each of the characters, an absolute value of the belonging parameter becoming maximum at the predetermined value;

a propagating unit configured to propagate each of the belonging parameters to any of adjacent regions of the corresponding region so that the absolute value of the belonging parameter decreases by a predetermined value every movement from the corresponding region to the adjacent region, the propagating unit being configured to set the belonging parameter after decrease to the corresponding region in a case where any other belonging parameter has not been set thereto yet; and an indicator setting unit configured to calculate, as a result of a fact that each of the belonging parameters is propagated, a sum of absolute values of two different belonging parameters in a predetermined region at Which a moving number of regions from each of regions at which two characters belonging to different groups are respectively positioned is substantially equal to each other or a boundary of the predetermined region, propagation of the different belonging parameters encountering each other at the predetermined region or on the boundary of the predetermined region, the indicator setting unit being configured to set, with respect to a region where the sum of the absolute values satisfies a predetermined condition or a boundary portion of the region, the region, the boundary of the region, or regions adjacent to the boundary of the region as an indicator portion, the indicator portion becoming an indicator of an action of the character.

(8) The video game processing system according to (7),
wherein the server includes the region setting unit, the belonging parameter setting unit, the propagating unit, and the indicator setting unit, and
wherein the user terminal includes an outputting unit configured to output a game screen to a display screen of a display device, the game screen indicating a state where a character control is executed on a basis of the indicator set by the indicator setting unit.

(9) A non-transitory computer-readable medium including a video game processing program for causing a user terminal to perform terminal functions to control progress of a video game, the terminal functions comprising:
a function configured to receive, from a server, information regarding server functions included in the server; and
a function configured to execute an input or an output corresponding to each of the server functions,
wherein the server comprises the server functions including:
a region setting function configured to set a plurality of regions by grouping movable areas of a character in a virtual space on a basis of a predetermined rule;
a belonging parameter setting function configured to set, in a case where each of two or more characters respectively belonging to different groups in the virtual space is positioned at any of the regions, a predetermined value to each of the regions at which the characters are respectively positioned as a belonging parameter, the belonging parameter indicating a belonging group of each of the characters, an absolute value of the belonging parameter becoming maximum at the predetermined value;
a propagating function configured to propagate each of the belonging parameters to any of adjacent regions of the corresponding region so that the absolute value of the belonging parameter decreases by a predetermined value every movement from the corresponding region to the adjacent region, the propagating function being configured to set the belonging parameter after decrease to the corresponding region in a case where any other belonging parameter has not been set thereto yet; and
an indicator setting function configured to calculate, as a result of a fact that each of the belonging parameters is propagated, a sum of absolute values of two different belonging parameters in a predetermined region at which a moving number of regions from each of regions at which two characters belonging to different groups are respectively positioned is substantially equal to each other or a boundary of the predetermined region, propagation of the different belonging parameters encountering each other at the predetermined region or on the boundary of the predetermined region, the indicator setting function being configured to set, with respect to a region where the sum of the absolute values satisfies a predetermined condition or a boundary portion of the region, the region, the boundary of the region, or regions adjacent to the boundary of the region as an indicator portion, the indicator portion becoming an indicator of an action of the character.

(10) A non-transitory computer-readable medium including a video game processing program for causing a user terminal to perform functions to control progress of a video game, the functions comprising:
a region setting function configured to set a plurality of regions by grouping movable areas of a character in a virtual space on a basis of a predetermined rule;
a belonging parameter setting function configured to set, in a case where each of two or more characters respectively belonging to different groups in the virtual space is positioned at any of the regions, a predetermined value to each of the regions at which the characters are respectively positioned as a belonging parameter, the belonging parameter indicating a belonging group of each of the characters, an absolute value of the belonging parameter becoming maximum at the predetermined value;
a propagating function configured to propagate each of the belonging parameters to any of adjacent regions of the corresponding region so that the absolute value of the belonging parameter decreases by a predetermined value every movement from the corresponding region to the adjacent region, the propagating function being configured to set the belonging parameter after decrease to the corresponding region in a case where any other belonging parameter has not been set thereto yet; and
an indicator setting function configured to calculate, as a result of a fact that each of the belonging parameters is propagated, a sum of absolute values of two different belonging parameters in a predetermined region at which a moving number of regions from each of regions at which two characters belonging to different groups are respectively positioned is substantially equal to each other or a boundary of the predetermined region, propagation of the different belonging parameters encountering each other at the predetermined region or on the boundary of the predetermined region, the indicator setting function being configured to set, with respect to a region where the sum of the absolute values satisfies a predetermined condition or a boundary portion of the region, the region, the boundary of the region, or regions adjacent to the boundary of the region as an indicator portion, the indicator portion becoming an indicator of an action of the character.

(11) A non-transitory computer-readable medium including a video game processing program for causing a server to perform at least one function of the functions that the video game processing program described in (10) causes the user terminal to perform, the server being capable of communicating with the user terminal.

(12) A user terminal into which the video game processing program described in (10) or (11) is installed.

(13) A video game processing method of executing a process to control progress of a video game, the video game processing method comprising:
a region setting process configured to set a plurality of regions by grouping movable areas of a character in a virtual space on a basis of a predetermined rule;
a belonging parameter setting process configured to set, in a case where each of two or more characters respectively belonging to different groups in the virtual space is positioned at any of the regions, a predetermined value to each of the regions at which the characters are respectively positioned as a belonging parameter, the belonging parameter indicating a belonging group of each of the characters, an absolute value of the belonging parameter becoming maximum at the predetermined value;

a propagating process configured to propagate each of the belonging parameters to any of adjacent regions of the corresponding region so that the absolute value of the belonging parameter decreases by a predetermined value every movement from the corresponding region to the adjacent region, the propagating process being configured to set the belonging parameter after decrease to the corresponding region in a case where any other belonging parameter has not been set thereto yet; and an indicator setting process configured to calculate, as a result of a fact that each of the belonging parameters is propagated, a sum of absolute values of two different belonging parameters in a predetermined region at which a moving number of regions from each of regions at which two characters belonging to different groups are respectively positioned is substantially equal to each other or a boundary of the predetermined region, propagation of the different belonging parameters encountering each other at the predetermined region or on the boundary of the predetermined region, the indicator setting process being configured to set, with respect to a region where the sum of the absolute values satisfies a predetermined condition or a boundary portion of the region, the region, the boundary of the region, or regions adjacent to the boundary of the region as an indicator portion, the indicator portion becoming an indicator of an action of the character.

(14) A video game processing method executed by a video game processing system for executing a process to control progress of a video game, the video game processing system including a communication network, a server, and a user terminal, the video game processing method comprising:

a region setting process configured to set a plurality of regions by grouping movable areas of a character in a virtual space on a basis of a predetermined rule;

a belonging parameter setting process configured to set, in a case where each of two or more characters respectively belonging to different groups in the virtual space is positioned at any of the regions, a predetermined value to each of the regions at which the characters are respectively positioned as a belonging parameter, the belonging parameter indicating a belonging group of each of the characters, an absolute value of the belonging parameter becoming maximum at the predetermined value;

a propagating process configured to propagate each of the belonging parameters to any of adjacent regions of the corresponding region so that the absolute value of the belonging parameter decreases by a predetermined value every movement from the corresponding region to the adjacent region, the propagating process being configured to set the belonging parameter after decrease to the corresponding region in a case where any other belonging parameter has not been set thereto yet; and an indicator setting process configured to calculate, as a result of a fact that each of the belonging parameters is propagated, a sum of absolute values of two different belonging parameters in a predetermined region at which a moving number of regions from each of regions at which two characters belonging to different groups are respectively positioned is substantially equal to each other or a boundary of the predetermined region, propagation of the different belonging parameters encountering each other at the predetermined region or on the boundary of the predetermined region, the indicator setting process being configured to set, with respect to a region where the sum of the absolute values satisfies a predetermined condition or a boundary portion of the region, the region, the boundary of the region, or regions adjacent to the boundary of the region as an indicator portion, the indicator portion becoming an indicator of an action of the character.

INDUSTRIAL APPLICABILITY

According to one of the embodiments of the present invention, it is useful to reduce a processing load required for a search of a moving route of an object.

What is claimed is:

1. A non-transitory computer-readable medium including a video game processing program for causing a server to perform functions to control progress of a video game, the functions comprising:

a region setting function configured to set a plurality of regions by grouping movable areas of a character in a virtual space on a basis of a predetermined rule;

a belonging parameter setting function configured to set, if each character of two or more characters respectively belonging to different groups in the virtual space is positioned at any region of the plurality of regions, a first predetermined value to each region of the regions at which the characters are respectively positioned as a belonging parameter, the belonging parameter indicating a belonging group of each character of the characters, an absolute value of the belonging parameter becoming maximum at the first predetermined value;

a propagating function configured to propagate each belonging parameter of the belonging parameters to any region of adjacent regions of the corresponding region so that the absolute value of the belonging parameter decreases by a second predetermined value at every movement from the corresponding region to the adjacent region, the propagating function being configured to set the belonging parameter after decrease to the corresponding region if any other belonging parameter has not been set thereto yet; and an indicator setting function configured to calculate, as each belonging parameter of the belonging parameters is propagated, a sum of absolute values of two different belonging parameters in a predetermined region at which a number of movements from each region of regions at which two characters belonging to different groups are respectively positioned is substantially equal to each other or a boundary of the predetermined region, the different belonging parameters propagated encountering each other at the predetermined region or on the boundary of the predetermined region, the indicator setting function being configured to set, with respect to a region where the sum of the absolute values satisfies a predetermined condition or a boundary portion of the region, the region, the boundary of the region, or regions adjacent to the boundary of the region as an indicator portion, the indicator portion becoming an indicator of an action of the character.

2. The non-transitory computer-readable medium according to claim 1, wherein the functions further include:

an installation registering function configured to register, if an object that exerts an effect on the characters respectively belonging to the different groups is installed in any region of the plurality of regions on a basis of an action of the character, installation of the object to a predetermined position in the corresponding region, wherein the belonging parameter setting function is configured to set the first predetermined value as the belonging parameter of the character belonging a different group from that of the character installed in the region in which the object is installed, wherein the propagating function is configured to propagate the belonging parameter from the region in which the object is installed, and wherein the indicator setting function is configured to determine the region at which the belonging parameters propagated from the region in which the object is installed encounter each other or a boundary of the region, and further configured to execute setting of the indicator portion.

3. The non-transitory computer-readable medium according to claim 1, wherein the indicator setting function is configured to determine a region or a boundary portion of the region at which the sum of the absolute values calculated in the region at which the different belonging parameters propagated encounter each other or a boundary of the region becomes the maximum, and further configured to set the region, the boundary of the region, or regions adjacent to the boundary of the region as the indicator portion becoming the indicator of the action of the character.

4. The non-transitory computer-readable medium according to claim 1, wherein the region setting function is configured to set the plurality of regions so that a size of each region of the plurality of regions becomes substantially equal to each other.

5. A video game processing system for executing a process to control progress of a video game, the video game processing system comprising a communication network, a server, and a user terminal, the video game processing system comprising:

a region setting unit configured to set a plurality of regions by grouping movable areas of a character in a virtual space on a basis of a predetermined rule;

a belonging parameter setting unit configured to set, if each character of two or more characters respectively belonging to different groups in the virtual space is positioned at any region of the plurality of regions, a first predetermined value to each region of the regions at which the characters are respectively positioned as a belonging parameter, the belonging parameter indicating a belonging group of each character of the characters, an absolute value of the belonging parameter becoming maximum at the first predetermined value;

a propagating unit configured to propagate each belonging parameter of the belonging parameters to any region of adjacent regions of the corresponding region so that the absolute value of the belonging parameter decreases by a second predetermined value at every movement from the corresponding region to the adjacent region, the propagating unit being configured to set the belonging parameter after decrease to the corresponding region if any other belonging parameter has not been set thereto yet; and an indicator setting unit configured to calculate, as each belonging parameter of the belonging parameters is propagated, a sum of absolute values of two different belonging parameters in a predetermined region at which a number of movements from each region of regions at which two characters belonging to different groups are respectively positioned is substantially equal to each other or a boundary of the predetermined region, the different belonging parameters propagated encountering each other at the predetermined region or on the boundary of the predetermined region, the indicator setting unit being configured to set, with respect to a region where the sum of the absolute values satisfies a predetermined condition or a boundary portion of the region, the region, the boundary of the region, or regions adjacent to the boundary of the region as an indicator portion, the indicator portion becoming an indicator of an action of the character.

6. A non-transitory computer-readable medium including a video game processing program for causing a user terminal to perform functions to control progress of a video game, the functions comprising:

a region setting function configured to set a plurality of regions by grouping movable areas of a character in a virtual space on a basis of a predetermined rule;

a belonging parameter setting function configured to set, if each character of two or more characters respectively belonging to different groups in the virtual space is positioned at any region of the plurality of regions, a first predetermined value to each region of the regions at which the characters are respectively positioned as a belonging parameter, the belonging parameter indicating a belonging group of each character of the characters, an absolute value of the belonging parameter becoming maximum at the first predetermined value;

a propagating function configured to propagate each of the belonging parameters to any region of adjacent regions of the corresponding region so that the absolute value of the belonging parameter decreases by a second predetermined value at every movement from the corresponding region to the adjacent region, the propagating function being configured to set the belonging parameter after decrease to the corresponding region if any other belonging parameter has not been set thereto yet; and an indicator setting function configured to calculate, as each belonging parameter of the belonging parameters is propagated, a sum of absolute values of two different belonging parameters in a predetermined region at which a number of movements from each region of regions at which two characters belonging to different groups are respectively positioned is substantially equal to each other or a boundary of the predetermined region, propagation of the different belonging parameters encountering each other at the predetermined region or on the boundary of the predetermined region, the indicator setting function being configured to set, with respect to a region where the sum of the absolute values satisfies a predetermined condition or a boundary portion of the region, the region, the boundary of the region, or regions adjacent to the boundary of the region as an indicator portion, the indicator portion becoming an indicator of an action of the character.

* * * * *